Figure 1:
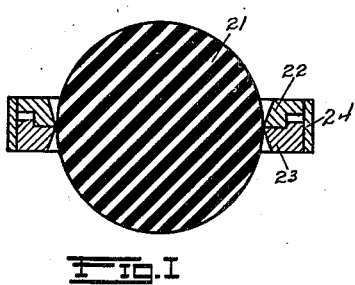

April 22, 1924.

J. SCHERNER 1,491,754

MOLDING

Filed July 31, 1922     2 Sheets-Sheet 1

JOHN SCHERNER
INVENTOR

BY Hadley H Freeman
ATTORNEY

April 22, 1924.   J. SCHERNER   1,491,754
MOLDING
Filed July 31, 1922   2 Sheets-Sheet 2

JOHN SCHERNER
INVENTOR
BY Hadley F. Newman
ATTORNEY

Patented Apr. 22, 1924.

1,491,754

UNITED STATES PATENT OFFICE.

JOHN SCHERNER, OF MILWAUKEE, WISCONSIN.

MOLDING.

Application filed July 31, 1922. Serial No. 578,798.

*To all whom it may concern:*

Be it known that I, JOHN SCHERNER, a citizen of the United States, and a resident of Milwaukee, in the county of Milwaukee and State of Wisconsin, have invented certain new and useful Improvements in Molding, of which the following is a specification.

Figure 2:
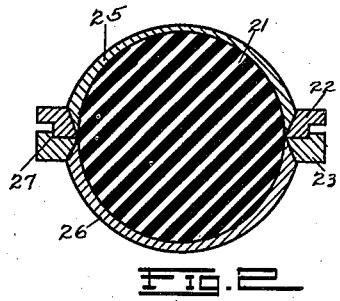
Figure 3:
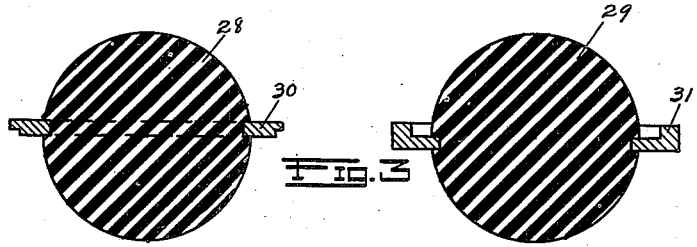
Figure 4:
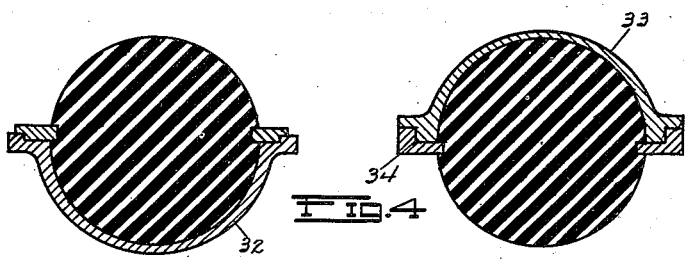
Figure 5:
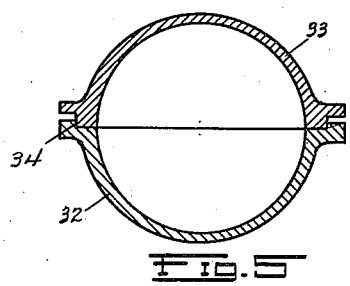
Figure 6:
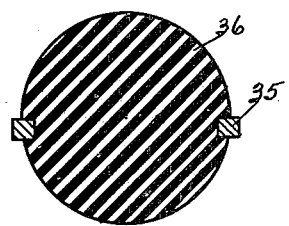
Figure 7:
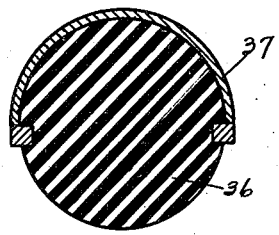
Figure 8:
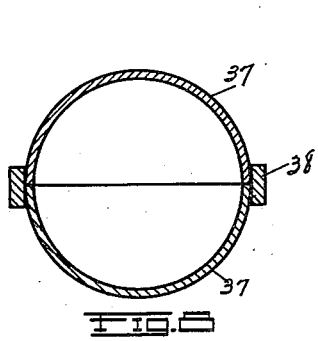
Figure 9:
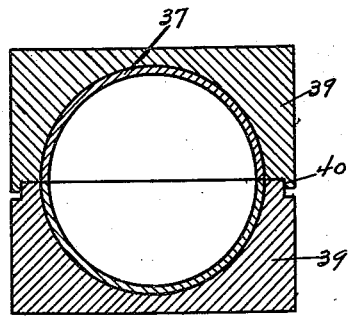
Figure 10:
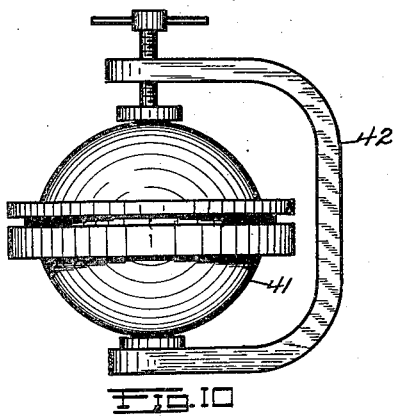

My invention relates to molding and the principal object of my invention is to provide a new and improved method of forming a mold and a new and improved method of remolding an article. In the drawings accompanying this specification and forming a part thereof I have shown, for purposes of illustration, one form which my invention may assume. In these drawings:

Figure 1 represents a replica of an article to be produced provided with suitable bounding pieces, Figure 2 shows the apparatus of Figure 1 after the mold has been electrolytically deposited, Figures 3, 4, and 5 illustrate an alternative method of forming the mold, Figures 6, 7, and 8 illustrate a further alternative, Figure 9 illustrates a still further alternative, while Figure 10 illustrates the method of using the mold for repairing.

In Figures 1 and 2 I show a body 21 which is a replica of the article to be produced by the mold and applied to this article I show a pair of bounding pieces 22 and 23 surrounded by a ring 24. This assembly is placed in an electrolytic bath, the terminal connected to the ring 24, a metal coating 25 deposited over the surface of the replica 21 within the area enclosed by the bounding piece 22, and a similar metal coating 26 deposited at the same time over the area of the replica 21 enclosed within the bounding piece 23. The ring 24 acts not only to conduct the current to the bounding pieces 22 and 23 but also to prevent undesired deposit on the junction of the bounding pieces. The mold thus formed is then removed from the replica 21 and may thereafter be used to form the desired article.

It will be noticed that the bounding pieces 22 and 23 are offset to provide a registering surface 27 to compel registration of the two halves of the mold. While this construction is not essential it is desirable and I prefer to form the molds in this manner. It will be understood that the replica 21 may be made of conducting material or may be non-conducting material coated with a conducting material such as graphite.

In Figures 3, 4, and 5 I show a modification in which two replicas 28 and 29 are employed on one of which is placed a bounding piece 30 and on the other a bounding piece 31. The replica 28 is made conducting on the lower half of its surface and the replica 29 on the upper half of its surface and the two replicas with their bounding pieces 30 and 31 are placed in the electrolytic bath with the terminals connected to the bounding pieces 30 and 31 whereupon a coating 32 is deposited on the lower surface of the replica 28 and a coating 33 is deposited on the upper surface of the replica 29. These two coatings are removed without removing the bounding rings whereupon they will be found to be of exactly the same form as the mold sections which are illustrated in Figure 2 and comprise the coatings 25 and 26 and the bounding pieces 22 and 23 and accordingly the two coatings 32 and 33 will be provided with a registering surface 34 equivalent to the registering surface 27 of the mold in Figure 2.

In the modification disclosed in Figures 6, 7, and 8, I apply a bounding piece 35 to a replica 36 which is conducting over that portion of its surface above the bounding piece 35 and then immerse the replica 36 and bounding piece 35 in the bath to form the deposit 37 after which I repeat this process to form a second deposit 37 which is combined with the first deposit to form a complete mold which may be held in registration by a ring 38.

In certain cases where it is necessary to subject the molds to very high pressure it is desirable to re-inforce the electrolytic coating. In Figure 9 I have shown the coatings 37 as reinforced by blocks 39 which may be of soft metal such as lead and may be provided with a registering surface 40.

In Figure 10 I show a mold 41 which may be produced in any one of the above manners or any other suitable manner but is shown as the mold produced by the method of Figures 1 and 2 and I have shown this mold as clamped together by a C clamp 42. I find such an arrangement particularly useful for repairing damaged golf balls. To carry out this process I produce a mold having the configuration of the desired exterior of the ball, place the ball within the mold, apply the clamp, and place the entire assembly in water at about 150 degrees Fahrenheit with the mold tightly pressed against the deformed ball. After the heat of the water has sufficiently softened the ball I put further tension on the mold and completely close it and in this manner force the exterior portion of the ball back from its deformed shape into the desired correct shape.

It will be understood that my method of producing molds may be modified and that these molds may be used for a variety of purposes besides the one herein specifically set forth and that the mold to be used for repairing may be produced in any desired manner either according to my invention or otherwise. Further, the bounding piece may be formed either separate from or integral with the replica, may be either conducting or non-conducting, and may or may not form any part of the completed mold. The entire disclosure herein is therefore illustrative only and my invention is not limited thereto.

I claim:

1. The method of producing a multi-part mold which comprises positioning a bounding piece on a replica of at least a part of the article to be produced in the mold and then electrodepositing metal onto the surface of said replica within said bounding piece.

2. The method of producing a multi-part mold which comprises positioning bounding pieces on a replica of the article to be produced in the mold and then electrodepositing metal onto the surfaces of said replica within said bounding pieces.

3. The method of producing a multi-part mold which comprises positioning a bounding piece on a replica of at least a part of the article to be produced in the mold, electrodepositing metal onto the surface of said replica within said bounding piece, and re-inforcing the mold-section thus formed with a suitable backing.

4. The method of producing a multi-part mold which comprises positioning bounding pieces on a replica of the article to be produced in the mold, electrodepositing metal onto the surfaces of said replica within said bounding pieces, and re-inforcing the mold sections thus formed with a suitable backing.

5. The method of producing a multi-part mold which comprises depositing metal onto a replica of at least a part of the article to be produced in the mold and within a bounding piece on said replica.

In testimony whereof I have signed my name to the above specification.

JOHN SCHERNER.